Sept. 17, 1935.   C. C. FARMER   2,014,887
LUBRICATING DEVICE
Filed Aug. 9, 1933
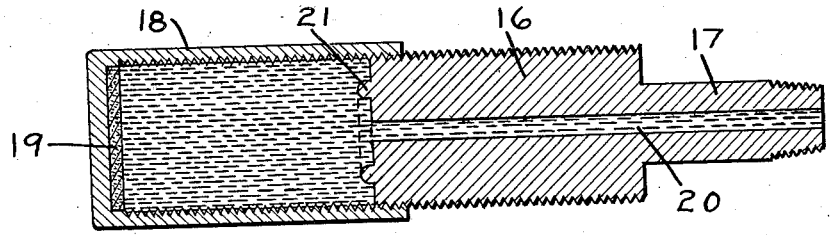
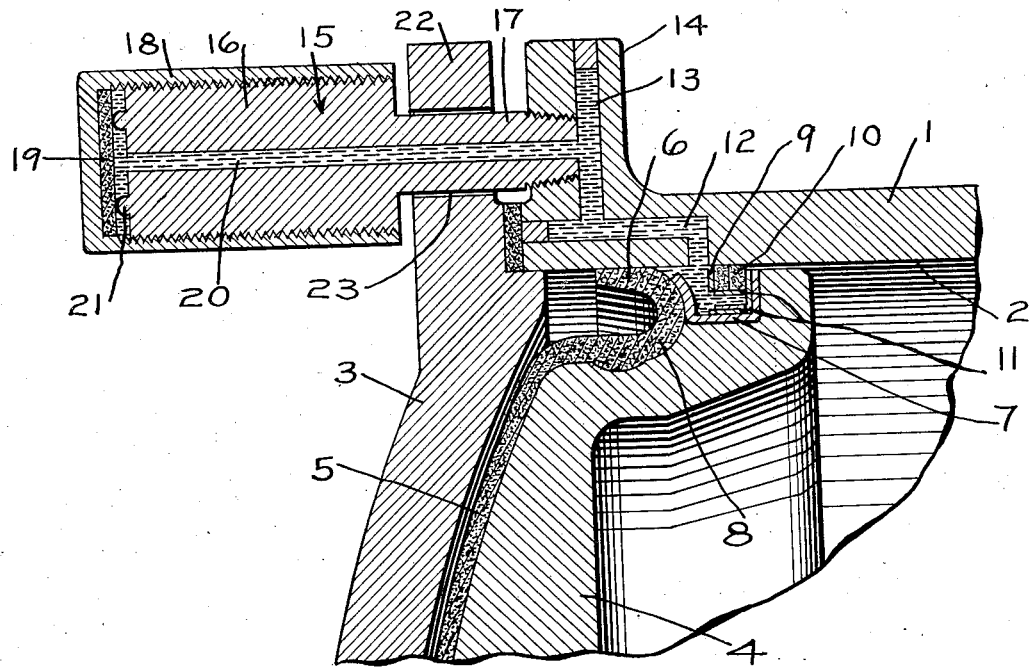
INVENTOR
CLYDE C. FARMER
BY
*Wm. M. Cady*
ATTORNEY Patented Sept. 17, 1935

2,014,887

UNITED STATES PATENT OFFICE 2,014,887

LUBRICATING DEVICE

Clyde C. Farmer, Pittsburgh, Pa., assignor to The Westinghouse Air Brake Company, Wilmerding, Pa., a corporation of Pennsylvania Application August 9, 1933, Serial No. 684,359

1 Claim. (Cl. 184—18)

This invention relates to lubricating devices, and more particularly to means for lubricating the cylinder wall and the piston packing of a brake cylinder, such as employed in fluid pressure brake systems.

It has heretofore been proposed to lubricate the brake cylinder piston packing and the cylinder wall by means of a force feed lubricating system, the lubricant being supplied to the brake cylinder at the desired periods of time. With such a system, however, it is possible to supply any quantity of lubricant to the brake cylinder, either too much or too little, as there is no way for the operator to judge or determine the correct charge of lubricant.

The principal object of my invention is to provide a force feed lubricating device for brake cylinders in which a definite and uniform amount of lubricant is supplied to the brake cylinder each time the brake cylinder is lubricated.

Other objects and advantages will appear in the following more detailed description of the invention.

In the accompanying drawing; Fig. 1 is a sectional view of a portion of a brake cylinder, showing my improved lubricating device applied thereto; and Fig. 2 a sectional view of the lubricating device, showing the same charged with lubricant before it is discharged into the brake cylinder.

In Fig. 1 of the drawing, a portion of a brake cylinder is shown comprising a cylinder 1 having an interior wall 2, a pressure head 3 secured to the open end of the cylinder 1, and the usual brake cylinder piston head 4, which is mounted in said cylinder.

While my improved lubricator may be applied to brake cylinders having other lubricating means, I have shown in the drawing, a lubricating means similar to that disclosed in my prior pending application, Serial No. 635,312, filed September 29, 1932, now Patent No. 1,972,732.

A cup-shaped packing member 5 is applied to the pressure side of the piston head 4 and at its periphery, the packing member is provided with a reversely turned annular flange 6, which is adapted to engage the interior wall 2 of the cylinder 1.

In a peripheral recess of the piston 4 open to the packing 5 is disposed an annular ring 7, which is U-shaped in cross section and has one side bent to conform to the contour of the reverse bend 8 of the packing and the other side in engagement with the side wall of the recess. The space within the ring 7 between the side walls, provides an annular chamber adapted to receive the brake cylinder lubricant.

Secured to the bottom wall of the ring 7 is an annular member 9, which is U-shaped in cross section, and mounted between the side walls of the member 9 is a lubricant distributing ring 10 of felt or other suitable lubricant distributing material, which is yieldingly pressed into engagement with the cylinder wall 2 by a spring ring 11.

Lubricant is supplied to the lubricant chamber of the brake cylinder piston through a bore 12 in the cylinder and a bore 13 in the cylinder flange 14, which opens into the bore 12.

My improved lubricator comprises a body member 15 having a section 16 of large diameter which is exteriorly threaded and a section 17 of small diameter which is provided at the outer end with pipe threads adapted to be screwed into a threaded opening in the flange 14, which opening leads to the bore 13.

An interiorly threaded lubricant cup 18 is adapted to be screwed onto the body member 15 and at the interior base of the cup a gasket 19 is disposed. A bore 20 extends axially through the body member 15, and an annular seat rib 21 is provided at the outer face of the member 15, surrounding the opening of the bore 20, so that when the cup is screwed down onto the member 15, the rib 21 will engage the gasket 19.

The annular flange 22 of the pressure head 3 is provided with an opening 23, through which the section 17 is passed, when the member 15 is screwed into the flange 14.

When it is desired to lubricate the brake cylinder, the cup 18 is unscrewed from the section 16 and is filled with the lubricant, the capacity of the cup being such that the desired amount of lubricant required to fill the lubricant chamber of the piston for the lubrication of the cylinder will be provided.

The cup 18 is then screwed onto the section 16, forcing the lubricant therein through the bore 20 and through the bores 13 and 12 into the lubricant chamber of the brake cylinder piston 4. The cup is screwed down until the rib 21 engages the gasket 19, so that possible leakage of fluid under pressure from the brake cylinder to the atmosphere by way of the grease cup will be prevented.

When the cup is screwed down, the end of the cup is flush with the end face of the section 16, so that dirt and foreign matter cannot collect on the threaded portion of the section 16 when in service.

While one illustrative embodiment of the invention has been described in detail, it is not my intention to limit its scope to that embodiment or otherwise than by the terms of the appended claim.

Having now described my invention, what I claim as new and desire to secure by Letters Patent, is:

The combination with a brake cylinder, of a lubricating device secured to said cylinder and comprising a body member having a passage through which lubricant is supplied to the brake cylinder, a lubricant containing cup having screw-threaded engagement with said member, a gasket disposed within said cup at the bottom wall, and an annular sealing rib positioned at the outer end of said member and surrounding the outlet opening of said passage and adapted to seat on said gasket, when the cup is screwed down, to prevent leakage of fluid under pressure from the brake cylinder.

CLYDE C. FARMER.